Oct. 20, 1925.

J. R. McFARLIN ET AL 1,557,716

ELECTRIC HEADLIGHT DIMMING AND COMPENSATING MEANS

Filed Jan. 14, 1920    2 Sheets-Sheet 1

Inventors:
John R. McFarlin,
and Elvy G. McAllister
By Chas. N. Butler
Attorney.

Oct. 20, 1925.　　　　　　　　　　　　　　　　1,557,716
J. R. McFARLIN ET AL
ELECTRIC HEADLIGHT DIMMING AND COMPENSATING MEANS
Filed Jan. 14, 1920　　　　2 Sheets-Sheet 2

Inventors
John R. McFarlin
and Elvy G. McAllister
By Chas. N. Butler
Attorney.

Patented Oct. 20, 1925.

1,557,716

UNITED STATES PATENT OFFICE.

JOHN R. McFARLIN, OF PHILADELPHIA, PENNSYLVANIA, AND ELVY G. McALLISTER, OF AUDUBON, NEW JERSEY, ASSIGNORS TO ELECTRIC SERVICE SUPPLIES COMPANY, OF PHILADELPHIA, PENNSYLVANIA, A CORPORATION OF PENNSYLVANIA.

ELECTRIC HEADLIGHT DIMMING AND COMPENSATING MEANS.

Application filed January 14, 1920. Serial No. 351,462.

*To all whom it may concern:*

Be it known that we, JOHN R. McFARLIN and ELVY G. McALLISTER, citizens of the United States, and residents, respectively, of Philadelphia, county of Philadelphia, and State of Pennsylvania, and of Audubon, county of Camden, and State of New Jersey, have jointly invented certain Improvements in Electric Headlight Dimming and Compensating means, of which the following is a specification.

This invention relates to improvements in the means for dimming electric headlights disclosed in Letters Patent of the United States No. 1,322,917, dated November 25th, 1919, and has as its primary object the provision of a set of car and headlight lamps, with means for dimming the headlight lamps without varying the brilliancy of the car lamps and for automatically inserting a compensating or equivalent resistance in circuit with the car lamps to replace a headlight lamp that is detached, burnt out or broken, the system being of such character that the car lamps will burn at constant brilliancy whether the headlight lamp be at full brilliancy, dimmed or out.

The invention comprises a circuit in shunt relation to the headlight lamp in combination with a relay in circuit with the lamp, the relay being excited by current through the lamp to open the shunt circuit and the shunt circuit being automatically closed when the relay is deenergized by breaking the circuit through the lamp.

The shunt circuit is provided with a compensating resistance which may be equivalent to that of the headlight lamp either alone or with the addition of series resistance so that the car lamps shall burn always at a substantially constant brilliancy, and provision is made for variously dimming the headlight lamp.

Figure 1:
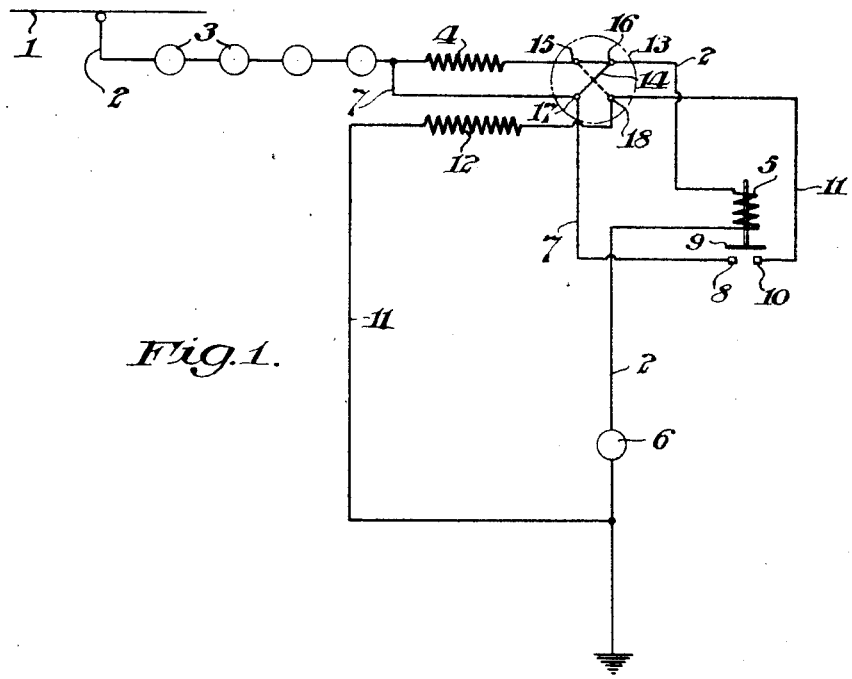
Figure 2:
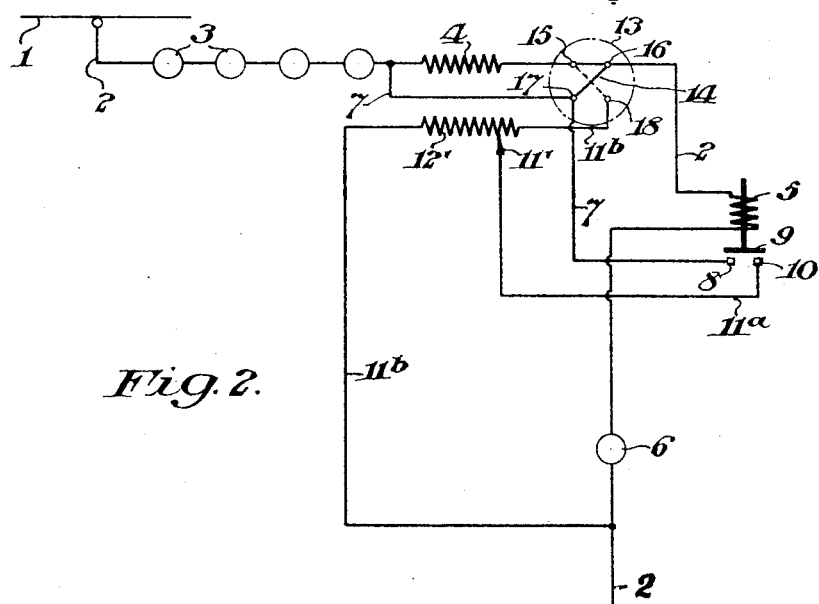
Figure 3:
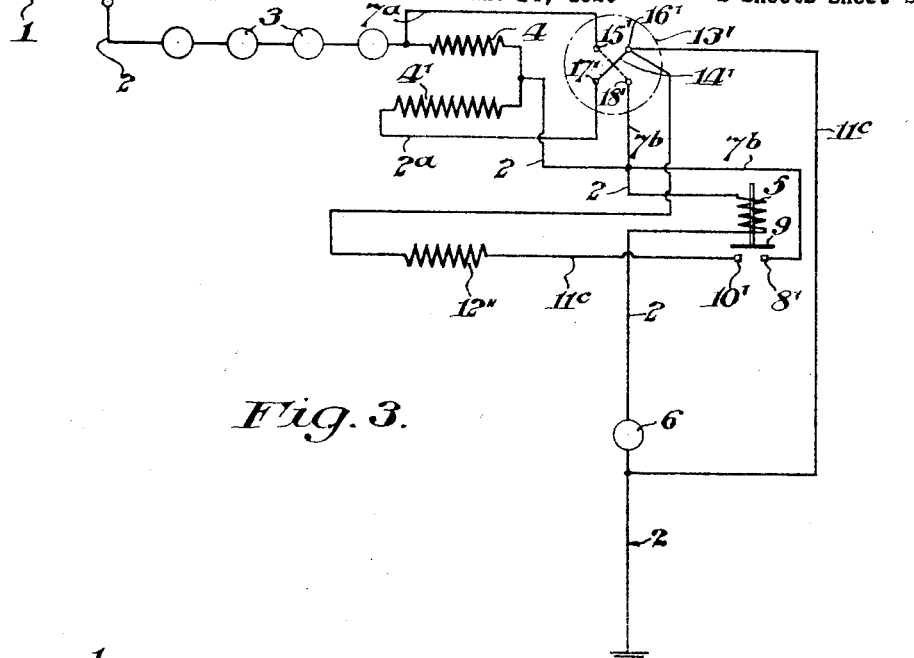
Figure 4:
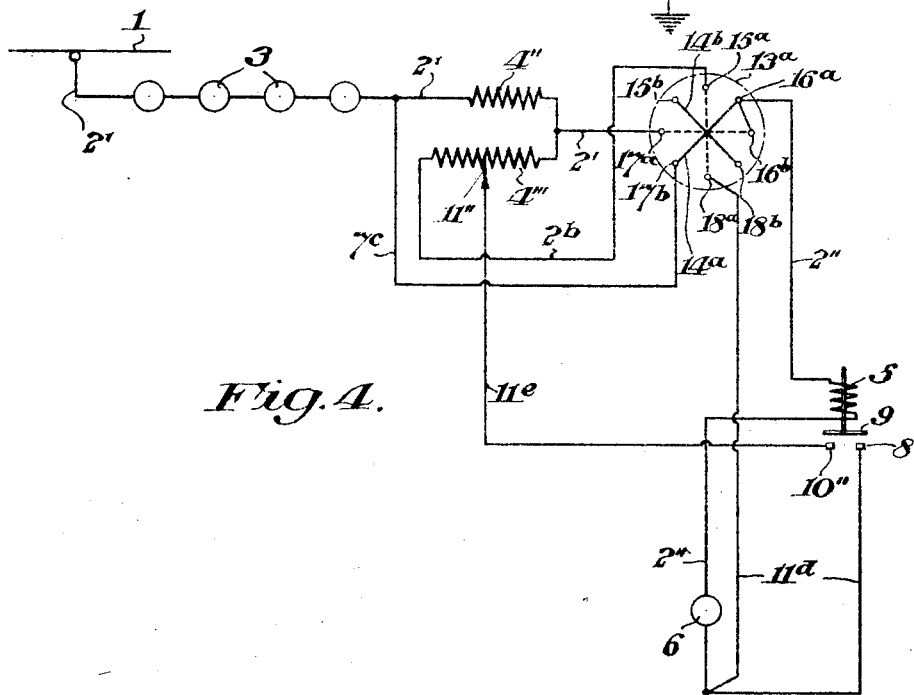

In the drawings, Fig. 1 shows diagrammatically a lay out providing for burning serially arranged car lamps at fixed full brilliancy when the headlight burns at full brilliancy, dimmed brilliancy or is out; Fig. 2 shows a second lay out by which the car lamps are burned at fixed brilliancy while the headlight may be at higher dimmed brilliancy and utilizes only a portion of the shunt resistance to compensate for the inoperative headlight lamp; Fig. 3 illustrates a lay out in which a separate compensating resistance unit is alone substituted for the inoperative headlight lamp in the full brilliancy position of the switch while series and shunt resistances with relation to the headlight are substituted when the latter becomes inoperative in the dimming position of the switch, and Fig. 4 is a lay out in which a double pole double throw snap switch is substituted for the single pole double throw switch of the previous lay outs with provision for a wide range of dimmed brilliancy of the headlight lamp and compensating for an inoperative headlight by resistance in series and part of resistance in shunt relation therewith.

In the application of the invention as illustrated in the drawings, the trolley wire 1 supplies current to the movable contacting conductor 2 containing the lamps 3 for illuminating the interior of the car.

As illustrated in Fig. 1, the conductor 2, which extends from the conductor 1 to ground, contains, in addition to the lamps 3, the series resistance 4, the relay coil 5 and the headlight lamp 6.

A conductor 7 connects the conductor 2, between the lamps 3 and the resistance 4, with a terminal 8 which is adapted to be connected automatically, by the armature 9 when the relay is deenergized, with the terminal 10 of a conductor 11 which contains the resistance 12 and is connected with the conductor 2 between the lamp 6 and the ground, providing a shunt circuit around the headlight lamp with a shunt resistance equal to that of the lamp.

A single pole double throw switch 13 has a blade 14 adapted to connect the points 15 and 18 in the conductors 2 and 11 and alternately therewith the points 16 and 17 in the respective conductors 2 and 7.

When the blade 14 is set to connect the points 16 and 17, current flows between the source of current 1 and the ground by way of the conductors 2, 7 and 14, through the serially arranged lamps 3, coil 5 and lamp 6, the resistance 4 being short circuited and the relay 5 being excited to break the shunt circuit around the lamp 6 which now burns at full brilliancy.

When the lever 14 is set to connect the points 15 and 18, current flows between the source of supply 1 and the ground through the conductor 2, containing the serially arranged lamps 3, resistance 4, coil 5 and lamp 6, and from the conductor 2 through the shunt circuit comprising the blade 14 and the conductor 11 with the resistance 12 therein to the conductor 2, between the lamp 6 and the ground, with the result that the headlight lamp is dimmed without changing the brilliancy of the lamps 3 since the resistances are proportioned so that the resistance between the source of supply 1 and the ground has not been changed substantially.

If in either position of the blade 14, with the headlight lamp 6 dimmed or burning at full brilliancy, this lamp should be broken, the coil 5 is deenergized by the interruption of its circuit and the armature 9 drops so as to connect the points 8 and 10, whereupon current flows from the source of supply 1 to the ground through the conductors 2, 3, 7, 9, 11 and 12. As the shunt resistance 12 is equal to that of the lamp 6 the lamps 3 continue to burn at full brilliancy.

In Fig. 2, the conductor 2 contains the serially arranged car lamps 3, resistance 4, relay coil 5, and headlight lamp 6, passing through the switch points 15 and 16. The conductor 7 connects the conductor 2 between the lamps 3 and the resistance 4 with the switch point 17 and the contact 8 which is adapted to be connected with the contact 10 by the armature 9. The contact 10 is connected by a conductor $11^a$ with a conductor $11^b$ which connects the switch point 18 through the resistance 12' with the conductor 2 between the lamp 6 and the ground, the conductor $11^a$ having a terminal $11^c$ connected intermediately of the resistance 12'.

When the blade 14 of the switch 13 connects the points 16 and 17, current flows between the source of electric energy 1 and the ground through the conductors 2, 3, 7, 14, 5 and 6. The headlight lamp 6 takes the full current and burns at full brilliancy, the resistance 4 being short circuited and the shunt circuit (through the conductors 7, 9, $11^a$ and $11^b$ containing a section of the resistance 12') being broken by the action of the excited coil 5 which disengages the armature 9 from the contacts 8 and 10.

If, now, the lamp 6 should become inoperative, the coil 5 would be deenergized and the armature 9 would drop to connect the parts 8 and 10, whereupon current would flow between the source of supply 1 and the ground through the conductors 2, 3, 7, 9, $11^a$, $11^b$ and a section of the resistance 12' adapted to maintain the lamps 3 at constant brilliancy.

When the switch lever 14 is set to connect the points 15 and 18, divided current flows from the point 15 to ground, on the one hand through the conductor 2, coil 5 and lamp 6, and on the other through the blade 14, conductor $11^b$ and resistance 12' in shunt relation to the lamp 6 which is now burned at reduced brilliancy.

If, now, the lamp 6 be broken, the coil 5 is deenergized and the armature 9 connects the points 8 and 10, whereupon current flows through the shunt circuit from the point 17 through the conductor 7, armature 9, conductor $11^a$, conductor $11^b$ and a section of the resistance 12', the brilliancy of the lamps 3 being maintained by the compensating section of resistance in the shunt circuit equal to that of the lamp 6.

As illustrated in Fig. 3, the source of current 1 is connected with the ground through the conductor 2 containing the lamps 3, the resistance 4, the relay coil 5 and the headlight lamp 6. A conductor $7^a$ connects the conductor 2 between the lamps 3 and the resistance 4 with the point 15' of the switch 13'. A conductor $7^b$, connected with the conductor 2 between the resistance 4 and the coil 5, connects the switch point 18' with the terminal 8' adapted to be connected by the relay armature 9 with the terminal 10' of a conductor $11^c$ containing the resistance 12", the conductor $11^c$ being connected with the point 16' of the switch 13' and with the conductor 2 between the lamp and the ground. A conductor $2^a$ containing the resistance 4' connects the conductor 2 between the resistance 4 and the conductor $7^a$ with the switch point 17'.

When the switch lever 14' connects the points 15' and 18', current flows between the conductor 1 and the ground through the conductors 2, 3, $7^a$, 14', $7^b$, 2, 5 and 6; the resistance 4 being short circuited, the circuits containing the resistances 4' and 12" being broken, and the lamp 6 burning at full brilliancy.

If, now, the lamp 6 should burn out or break, the coil 5 is deenergized and the armature 9 drops to connect the points 8' and 10', upon which current flows between the conductor 1 and the ground through the conductors 2, 3, $7^a$, 14', $7^b$, 9, $11^c$, 12" and 2, providing the compensating resistance necessary for maintaining the lamps 3 at the same brilliancy.

When the switch lever 14' connects the points 16' and 17', the source of current 1 and the ground are connected through the circuit comprising conductors 2, 3, 4, 5 and 6, and through the shunt circuit comprising the conductors $2^a$, 4', 14' and $11^c$ around the lamp 6, which burns with dimmed brilliancy.

If, now, the lamp 6 burns out, so that the coil 5 is deenergized and the armature 9 connects the points 8' and 10', current flows between the conductor 1 and the ground in shunt relation to the lamp through the circuit comprising the conductors 2, 3, 4, $7^a$, 9, $11^c$, 12", and 2, and through 4', $2^a$, 14' and 11ᶜ, providing the resistance necessary for maintaining the lamps 3 at the desired brilliancy.

As illustrated in Fig. 4, the trolley wire 1 is connected by the conductor 2′ containing the lamps 3 and the resistance 4″ with the point 17ᵃ of the double pole double throw switch 13ᵃ; the conductor 2ᵇ containing the resistance 4‴ connects the conductor 2′ between the resistance 4″ and the point 17ᵃ with the switch point 15ᵃ; a conductor 7ᶜ connects the conductor 2′, between the lamps 3 and the resistance 4″, with the switch point 17ᵇ; a conductor 2″ containing the relay coil 5 and the headlight lamp 6 connects the switch points 16ᵃ and 16ᵇ with the ground; a conductor 11ᵈ connects the switch point 18ᵃ with the conductor 2″ between the lamp 6 and the ground and with the contact point 8″, which is adapted to be connected by the relay armature 9 with the terminal 10″ of a conductor 11ᵉ which has a connection 11″ with the resistance 4‴ intermediately thereof.

When the switch blade 14ᵃ connects the points 16ᵃ and 17ᵇ, the coordinate blade 14ᵇ being on the disconnected points 15ᵇ and 18ᵇ, current flows between the trolley wire 1 and the ground, through the conductors 2′, 3, 7ᶜ, 14ᵃ, 2″, 5 and 6, the circuits through the resistances being broken and the lamp 6 receiving the full current causing it to burn at full brilliancy.

If, with the switch blade 14ᵃ connecting the points 16ᵃ and 17ᵇ, the lamp 6 be broken, the armature 9 connects the points 8″ and 10″ and current flows around the lamp 6 from the conductor 1 to ground through the conductors 2′, 3, 4″, 4‴, 11ᵉ, 9 11ᵈ, including a section of the resistance 4‴ making with resistance 4″ an equivalent resistance for that of the lamp 6.

When the switch blade 14ᵃ connects the points 16ᵇ and 17ᵃ and the blade 14ᵇ connects the points 15ᵃ and 18ᵃ, current flows between the conductor 1 and the ground through the circuit comprising the conductors 2′, 3, 4″, 14ᵃ, 2″, 5 and 6 and through the shunt circuit 2ᵇ, 4‴, 14ᵇ and 11ᵈ, dimming the lamp 6.

If, now, the lamp 6 burns out, the armature 9 connects the points 8″ and 10″, whereupon the current from the conductor 1 flows to ground through the conductors 2′, 3, 4″, 4‴, 11ᵉ, 9 and 11ᵈ, the section of the substituted resistance from 4‴ plus the resistance 4″ being equivalent to that of the lamp 6.

Having described our invention, we claim:

1. In a lighting system, a circuit comprising a set of lamps arranged in series; an auxiliary circuit around a lamp aforesaid and provided with resistance approximately equivalent to that through said lamp; said circuits having means for automatically opening and closing said auxiliary circuit when the circuit through said lamp is closed and open respectively, and means for passing divided current through said lamp and resistance so as to reduce the current through said lamp relatively to that through the remainder of said lamps.

2. In a lighting system, a circuit comprising a set of lamps arranged in series; an auxiliary circuit around a lamp aforesaid and provided with adjustable compensating resistance; said circuits having means for automatically opening and closing said auxiliary circuit when the circuit through said lamp is closed and open respectively to substitute said resistance for that of said lamp when the latter is inoperative, and means comprising a manually operated switch for passing divided current through said lamp and resistance so as to reduce the current through said lamp without substantially varying the current through the remainder of said lamps.

3. In a lighting system, the combination with lamps connected in series, dimming resistance, and switching mechanism operable to interpose or eliminate dimming resistance between lamps aforesaid, of compensatory resistance connected in series with said dimming resistance and in shunt with one of said lamps in the dimming position of said switching mechanism, and a circuit controlled by the lamp last named for connecting said compensatory resistance in series with the remainder of said lamps in either position of said switching mechanism.

In testimony whereof we have hereunto set our hands, this 12th day of January, 1920.

JOHN R. McFARLIN.
ELVY G. McALLISTER.